US 9,275,127 B1

United States Patent
Liao et al.

(10) Patent No.: US 9,275,127 B1
(45) Date of Patent: Mar. 1, 2016

(54) LOCATION CATEGORIZATION

(71) Applicant: MicroStrategy Incorporated, Vienna, VA (US)

(72) Inventors: Ying Liao, Sterling, VA (US); Jeff Zhang, McLean, VA (US); Yi Zheng, Herndon, VA (US)

(73) Assignee: MicroStrategy Incorporated, Vienna, VA (US)

( * ) Notice: Subject to any disclaimer, the term of this patent is extended or adjusted under 35 U.S.C. 154(b) by 291 days.

(21) Appl. No.: 13/917,854

(22) Filed: Jun. 14, 2013

(51) Int. Cl.
*G06F 17/30* (2006.01)

(52) U.S. Cl.
CPC ................ *G06F 17/30598* (2013.01)

(58) Field of Classification Search
CPC .............. G06F 17/30864; G06F 17/30867; G06F 17/30991
USPC ........................................ 707/722
See application file for complete search history.

(56) References Cited

U.S. PATENT DOCUMENTS

| 8,649,804 B2 | 2/2014 | Yoo | |
| 2006/0085667 A1* | 4/2006 | Kubota et al. | 714/4 |
| 2011/0082747 A1 | 4/2011 | Khan et al. | |
| 2011/0083101 A1 | 4/2011 | Sharon et al. | |
| 2011/0093458 A1* | 4/2011 | Zheng et al. | 707/724 |
| 2013/0103697 A1* | 4/2013 | Hill et al. | 707/748 |
| 2014/0095303 A1* | 4/2014 | Jones et al. | 705/14.49 |

\* cited by examiner

*Primary Examiner* — Scott A Waldron
*Assistant Examiner* — Dongming Wang
(74) *Attorney, Agent, or Firm* — Fish & Richardson P.C.

(57) ABSTRACT

Data associated with a plurality of check-ins performed by users of a social network is received by processors where each check-in identifies a location and tags associated with the location within the social network that are used by the social network to describe the location. A mapping of tags to categories from a list of categories where each tag is mapped to a single category is accessed by the processors. One or more categories are determined by the processors for each check-in based on the mapping of tags to categories for each check-in. A single category is identified by the processors from the determined one or more categories for each check-in. Data associating each check-in is stored by the processors in association with the identified category for each check-in. Data representing the plurality of check-ins and the respective single category for each check-in is outputted for display by the processors.

17 Claims, 7 Drawing Sheets

LOCATION CATEGORIZATION

BACKGROUND

An electronic social networking platform may store data about or otherwise related to locations visited by users of the electronic social networking platform.

SUMMARY

In general, one aspect of the subject matter described in this specification may include data associated with a plurality of check-ins performed by users of an electronic social networking platform is received by one or more processors where each check-in of the plurality of check-ins identifies a location and two or more tags associated with the location within the electronic social networking platform that are used by the electronic social networking platform to describe the location. A mapping of tags used by the electronic social networking platform to describe locations represented within the electronic social networking platform to categories from a list of categories where each tag is mapped to a single category within the list of categories is accessed by the one or more processors. One or more categories from the list of categories are determined by the one or more processors for each check-in of the plurality of check-ins based on the mapping of tags to categories for each check-in of the plurality of check-ins. A single category is identified by the one or more processors from the determined one or more categories for each check-in of the plurality of check-ins. Data associating each check-in of the plurality of check-ins is stored by the one or more processors in association with the identified category for each check-in of the plurality of check-ins. Data representing the plurality of check-ins and the respective single category for each check-in is outputted for display by the one or more processors.

Implementations can include one or more of the following features. For example, each tag associated with the location within the electronic social networking platform may be mapped to a single category within the list of categories, the list of categories may be ranked, and a highest ranking single category from the one or more categories may be identified based on the ranking of the list of categories. Information associated with the location of the respective check-in may be analyzed to identify the single category from the determined one or more categories. The received data associated with the plurality of check-ins may include a name of the location, an identity of the user of the electronic social networking platform who performed the check-in, and/or a date that the check in was recorded with the social networking platform.

A set of users of the electronic social networking platform which have performed at least two check-ins at a particular location may be determined, information identifying the set of users as repeat visitors of the particular location may be stored, and outputting data representing the plurality of check-ins and the respective single category for each check-in for display may include information identifying the repeat visitors. Outputting data representing the plurality of check-ins and the respective single category for each check-in for display may include information identifying the set of repeat visitors comprises outputting for display, from the one or more processors, data representing the plurality of check-ins and the respective single category for each check-in including information identifying unique visitors for the category. A user selection of a category may be received and, in response to the user selection, a list of names of locations associated with check-ins mapped to the selected category may be provided for display.

Other features may include corresponding systems, apparatus, and computer programs encoded on computer storage devices configured to perform the foregoing actions.

The details of one or more implementations are set forth in the accompanying drawings and the description, below. Other features will be apparent from the description and drawings, and from the claims.

DETAILED DESCRIPTION

Figure 1A:
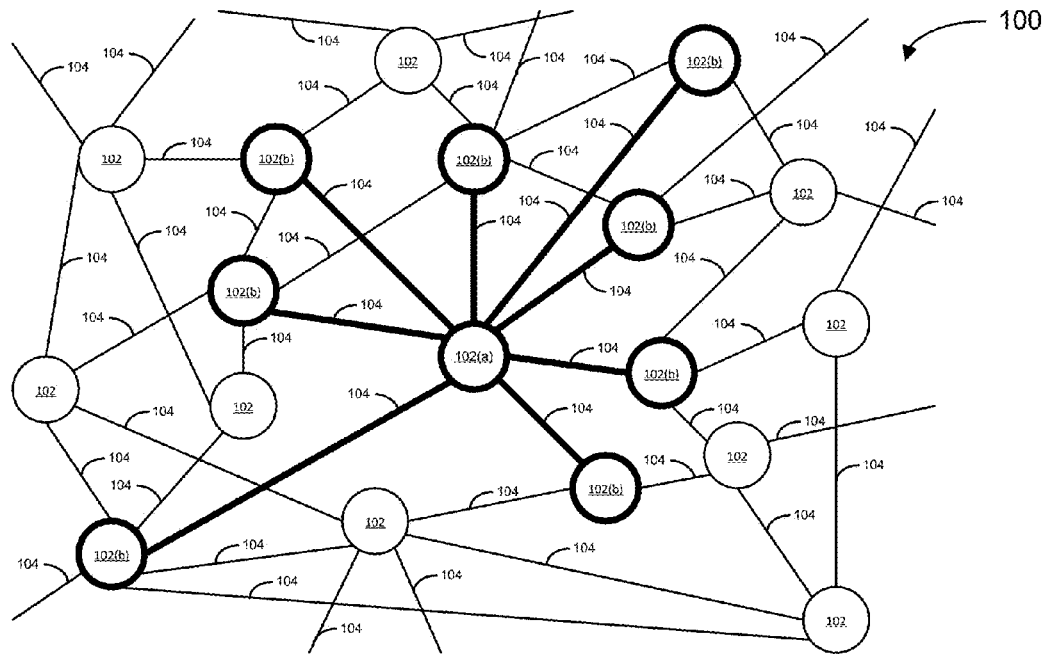
FIGS. 1A and 1B are schematic diagrams of examples of electronic social networking platforms.

An application may receive data from an electronic social networking platform on behalf of users of the application who also are represented by user identities within the electronic social networking platform. This data received from the electronic social networking platform may include data about or otherwise related to the users of the application. In addition, this data received from the electronic social networking platform may include data about or otherwise related to other user identities within the electronic social networking platform. After receiving this data from the electronic social networking platform, the application may process the received data to enable analysis of the received data, for example to glean intelligence about the users of the application and/or other user identities within the electronic social networking platform. In some implementations, the application may enable users of the application who also are represented by user identities within the electronic social networking platform to analyze the data received from the electronic social networking platform. Additionally or alternatively, the application may enable administrators or other representatives of the application to analyze the data received data from the electronic social networking platform. Furthermore, the application may enable various other third parties to analyze the data received from the electronic social networking platform.

For example, an application may enable a user to analyze data related to locations that users of the social networking platform have visited. The locations a user has visited may be identified with "check-ins." A "check-in" may be represented as a connection between a user of a social networking platform and a social networking location object representing a location created by the user (or on behalf of the user) of the social networking platform. A location object may identify a location and may include a brief description of the location and/or links to a description of the location. Locations may include, for instance, geographic locations, such as cities, states, or countries, as well as commercial venues, businesses, or other places, such as restaurants, retail stores, parks, train or bus stations, airports, etc.

The social networking platform may record user check-ins in various ways. For example, a user may directly record a check-in using a link, button, voice-command or any other means provided within the social networking platform. Alternatively or in addition, the social networking platform may record a user check-in when it identifies that a specific user interaction with the social networking platform (e.g., a post, etc.) has originated from a particular location. For instance, a user may take a family picture on his smartphone at a baseball game and post the picture on the social networking platform from the game. If the social networking platform identifies that the picture was posted from the stadium (e.g., via cellular triangulation or GPS) the platform may record a check-in for the user's social networking platform user identity at the stadium. In addition, the social networking platform may use a post, picture, or video posted by the user to record a check-in for a different user who was tagged in the first user's post, picture, or video. Continuing the prior example, if the user tags his child in the picture that he posted to the social networking platform at the baseball game, the social networking platform may record a check-in at the stadium for the child's social networking platform user identity.

The application may use data associated with the locations in the social networking platform (e.g., tags) to classify the locations into a manageable number of different categories. As described herein, a tag may be a brief descriptive or identifying word or phrase associated with a location within a social networking platform. Furthermore, a category may be a distinct class (e.g., used by a social intelligence application) for classifying locations associated with social network platform user check-ins.

A user may be allowed to readily view and analyze data pertaining to the categories of locations and/or individual locations at which users have registered check-ins that have been received from the social networking platform. For example, the data may include the number of locations within each category at which users have recorded check-ins, the number of visits and repeat visitors to locations within each category by users of the social networking platform, and the percentage of total visitors to locations who were repeat visitors. The application may thus provide a user with an indication of social trends within a region and/or the popularity of individual locations.

There are many different examples of electronic social networking platforms. Facebook, Twitter, Linked In, Google-+, MySpace, and Orkut are just a few examples. But, there are many others, and it is reasonable to expect many more to be developed in the future. Techniques are described herein for receiving, analyzing, and/or acting upon data from an electronic social networking platform. These techniques are widely applicable and may be employed in connection with any of the above electronic social networking platforms or any other electronic social networking platforms.

Electronic social networking platforms often enable an individual user identity to create a user profile that reflects various different types of information about or otherwise related to the user identity. Such a profile for a particular user identity may be helpful to other user identities of the electronic social networking platform who are interested in learning more about the particular user identity. Similarly, the profile for the particular user identity may be helpful to the user identities of the electronic social networking platform who are interested in confirming that the particular user identity represents a particular human user within the electronic social networking platform.

For example, an electronic social networking platform may maintain a user profile for a user identity that reflects the user identity's name, gender, age, relationship status, education history (e.g., schools attended and/or degrees awarded), employment history (e.g., employers and/or positions held), contact information (e.g., e-mail address(es), telephone number(s), other electronic addresses, physical addresses, etc.), current residence information (e.g., city, state/territory, and/or country), hometown information (e.g., city, state/territory, and/or country), primary language, and/or sexual orientation.

Additionally or alternatively, the user identity's profile also may reflect various different interests of the user identity and/or indications of various different locations that the user identity (or another user identity, such as, for example, a member of the user identity's social network) has registered with the electronic social networking platform as locations that the user identity has visited. Such locations may include a wide variety of different types of locations, including, for example, geographic locations, such as cities, states, or countries, as well as commercial venues, businesses, or other places, such as restaurants, retail stores, parks, train or bus stations, airports, etc. For ease of reference, indications of locations registered with an electronic social networking platform as locations that a user identity has visited may be referred to herein as "check-ins," and information stored in a user identity's profile that reflects such indications of locations registered with the electronic social networking platform as locations that the user identity has visited may be referred to herein as "check-in information." Check-in information may include, for instance, a link to a page within the social networking platform describing the location at which the user identity has registered a "check-in."

Electronic social networking platforms also typically enable an individual user identity (e.g., representing a human user who has registered with the electronic social networking platform and/or a human user who has been assigned a unique or otherwise identifying identifier by the electronic social networking platform) to establish connections with other user identities. These connections between user identities may reflect relationships between the underlying human users of the electronic social networking platform who are represented by the user identities. For example, a connection between two user identities within an electronic social networking platform may reflect a social friendship (e.g., developed through physical interaction in the real-world and/or through on-line interaction in the cyber-world) or a professional relationship between the underlying human users represented by the user identities.

In some electronic social networking platforms, user identities may be able to form connections with other user identities unilaterally. For example, an electronic social networking platform may enable a first user identity to form a connection to a second user identity simply by requesting to form a connection to the second user identity (without requiring authorization of the connection by the second user identity). Alternatively, in other electronic social networking platforms, the formation of connections between two user identities may involve bilateral participation by both user identities. For example, in such electronic social networking platforms, when a first user identity requests to form a connection to a second user identity, the electronic social networking platform may establish the connection between the first and second user identities only after receiving authorization to form the connection from the second user identity.

A user identity's social network within an electronic social networking platform may be defined based on the connections between the user identity and other user identities of the electronic social networking platform. In some cases, the social network of a particular user identity of an electronic social networking platform may be defined as the group of other user identities to whom the particular user identity is directly connected. Alternatively, in other cases, the social network of a particular user identity of an electronic social networking platform may be defined to extend beyond the group of other user identities to whom the particular user identity is directly connected to include other user identities who are within a threshold level of proximity to the particular user identity within the electronic social networking platform. For example, social proximity between two user identities of an electronic social networking platform may be measured in terms of the number of degrees of separation (or the number of other intermediate, interconnected user identities required to form a connection) between the two user identities within the electronic social networking platform, and the social network of a particular user identity within the electronic social networking platform may be defined to include a group of other user identities who are within a threshold number of degrees of separation of the particular user identity.

Commonly, an electronic social networking platform may provide a particular user identity with certain increased functionality in connection with other user identities who are members of the particular user identity's social network within the electronic social networking platform that the electronic social networking platform may not provide to the particular user identity in connection with user identities who are not members of the particular user identity's social network within the electronic social networking platform. For example, an electronic social networking platform may provide a particular user identity with one or more different mechanisms for electronically communicating or otherwise sharing content with other user identities who are members of the particular user identity's social network within the electronic social networking platform. Furthermore, an electronic social networking platform may allow a particular user identity to access more detailed profile information about other user identities who are members of the particular user identity's social network within the electronic social networking platform than the electronic social networking platform allows the particular user identity to access about user identities who are not members of the particular user identity's social network. Additionally or alternatively, an electronic social networking platform may enable a particular user identity to access check-ins registered with the electronic social networking platform by members of the particular user identity's social network within the electronic social networking platform, while not enabling the particular user identity to access check-ins registered with the electronic social networking platform by user identities who are not members of the particular user identity's social network within the electronic social networking platform.

The connections between individual user identities within an electronic social networking platform may be represented in the form of a graph, where user identities are represented by nodes and connections between user identities are represented by edges connecting the nodes. As new user identities join and other user identities stop using the electronic social networking platform and/or as new connections between user identities are formed and old connections between user identities are dissolved, this graph of interconnected user identities may change dynamically in time to represent the current state of connections between user identities within the electronic social networking platform.

For situations in which the systems discussed herein collect personal information about users, the users may be provided with an opportunity to opt in/out of programs or features that may collect personal information (e.g., information about a user's preferences or a user's current location). In addition, certain data may be anonymized in one or more ways before it is stored or used, so that personally identifiable information is removed. For example, a user's identity may be anonymized.

FIG. 1A is a schematic diagram of an example of an electronic social networking platform. As illustrated in FIG. 1A, the electronic social networking platform is represented as a graph 100 of nodes 102 connected by edges 104. In some implementations, each node 102 of graph 100 may represent an individual user identity of the electronic social networking platform. In such implementations, an edge 104 that connects two nodes 102 represents a connection that has been formed between the two user identities that are represented by the connected nodes 102. For example, the edges 104 that connect node 102(a) to nodes 102(b) represent connections that have been formed within the electronic social networking platform between the user identity represented by node 102(a) and the other user identities represented by nodes 102(b).

As discussed above, in some cases, an electronic social networking platform may define a particular user identity's social network as the group of other user identities to whom the user identity is directly connected. If this definition is applied within the electronic social networking platform illustrated in FIG. 1A, the social network for the user identity represented by node 102(a) would be defined as the group of other user identities represented by nodes 102(b).

In addition to enabling a user identity to establish connections to other user identities and thereby form a social network, some electronic social networking platforms may enable a particular user identity to divide the user identity's social network into one or more subsets of user identities who may, for example, share one or more characteristics of significance to the particular user identity. For example, a particular user identity of an electronic social networking platform may wish to define subsets of user identities within the particular user identity's social network that reflect other user identities with whom the particular user identity has a familial relationship, a professional relationship, or a social relationship. For ease of reference, such defined subsets of a particular user's social network may be referred to herein as "Friendlists."

As further discussed above, an electronic social networking application may facilitate the sharing of information and the exchange of electronic communications between a particular user identity and other user identities who are members of the particular user identity's social network. For example, referring to the electronic social networking platform represented in FIG. 1A, the electronic social networking application may provide mechanisms that facilitate the exchange of electronic communications between the user identity represented by node 102(a) and the user identities represented by nodes 102(b) who are part of the social network of the user identity represented by node 102(a). In some implementations, the electronic social networking application may provide a mechanism that enables the user identity represented by node 102(a) to send private electronic messages to any one or more of the user identities represented by nodes 102(a). Furthermore, the electronic social networking application also may provide a mechanism that enables the user identity represented by node 102(a) to broadcast an electronic message that is shared publicly with all (or some defined subset of all, such as, for example, one or more "Friendlists") of the user identities represented by nodes 102(b). Additionally or alternatively, the electronic social networking application may provide a mechanism that enables the user identity represented by node 102(a) to send a directed electronic message to a user identity that is represented by a particular one of nodes 102(b). In such cases, the recipient user identity of the directed message may determine whether this directed message is shared publicly with other user identities of the electronic social networking platform.

In addition to enabling user identities to establish connections to other user identities, some electronic social networking platforms enable user identities to establish connections with other types of objects. For example, some social networking platforms may enable user identities to record information about their hometowns, current places of residence, or places they have visited (including geographic locations (e.g., such as cities, states, or countries) as well as commercial venues, local businesses, or places (e.g., such as restaurants, retail stores, parks, train or bus stations, airports, etc.)) by establishing connections to location objects within the electronic social networking platforms. In some cases, a user identity may be said to record a check-in with an electronic social networking platform when the user identity records information within the electronic social networking platform about a location the user identity has visited. Some electronic social networking platforms also may enable user identities to record check-ins on behalf of other user identities. For instance, some electronic social networking platforms may enable members of a particular user identity's social network to record a check-in on behalf of the particular user identity (e.g., when the user identities visit a location together). In such scenarios, the electronic social networking platform may record the location as a location the particular user identity visited even though the check-in at the location was not initiated by the particular user identity.

Additionally or alternatively, some social networking platforms may enable user identities to generate event objects within the electronic social networking platforms that represent events that they are hosting. After creating event objects for such events, user identities may be provided with mechanisms for inviting other user identities to the events. Furthermore, a connection may be established between an event object and a user identity within an electronic social networking platform as a result of the user identity being invited to the event and/or as a result of the user identity registering with the electronic social networking platform that the user identity will be attending the event.

Similarly, some social networking platforms may enable user identities to record endorsements of various different types of interests, for example, by establishing connections to interest objects that represent these interests. Such interest objects may include a variety of different types of objects including, for example, non-personal enterprise objects. Examples of such non-personal enterprise objects may include, among others, local businesses or places (e.g., restaurants, retail stores, parks, train or bus stations, airports, etc.); companies, organizations, or institutions; brands or products; artists, bands, or public figures; forms of entertainment (e.g., books, music albums, movies, etc.); and causes or communities. In some electronic social networking platforms, interest objects, including non-personal enterprise objects, may be manifested within the electronic social networking platforms as so-called "pages." These pages, especially pages associated with non-personal enterprise interest objects, may be maintained by one or more representatives of the interests or non-personal enterprises represented by the objects. In addition, among other features, these pages may provide information about the interests or non-personal enterprises represented by the objects. These pages also may provide conduits for enabling interaction between the interest or non-personal enterprise objects and the user identities that have formed connections to the objects that represent them. Furthermore, some electronic social networking platforms may enable pages, like user identities, to establish event objects related to events associated with the interest represented by the page.

Moreover, some social networking platforms may enable user identities to establish connections with independent applications that leverage the social networking platforms, for example, by granting the independent applications authorization to access or receive data from the electronic social networking platform on their behalf.

Figure 1B:
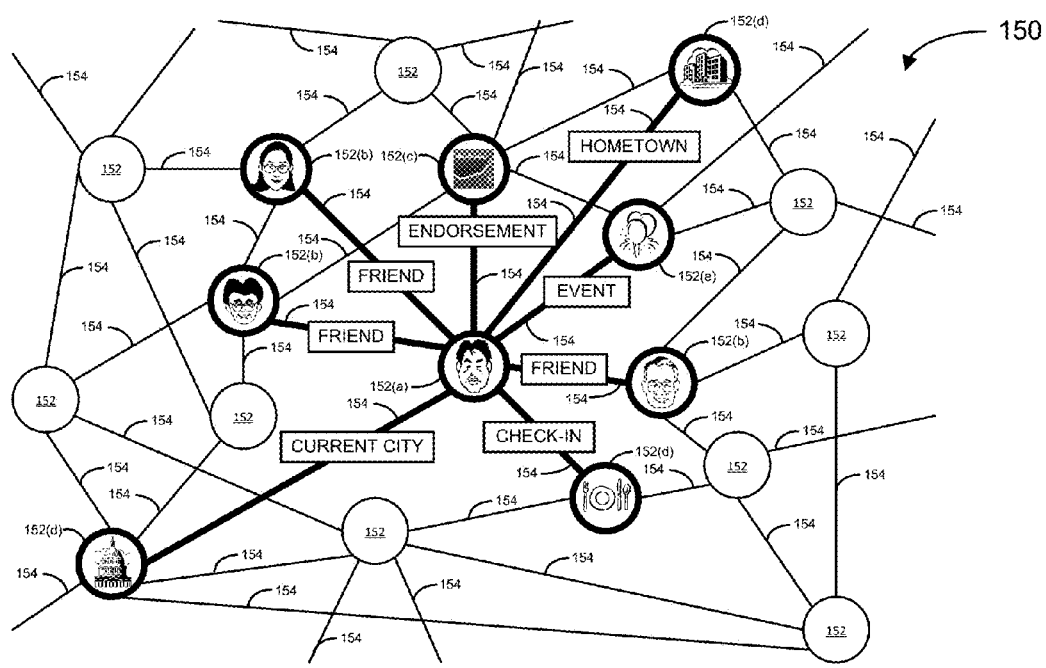

FIG. 1B is a schematic diagram of an example of an electronic social networking platform that enables user identities to form connections with multiple different types of objects including, for example, other user identity objects, location objects, event objects, and interest objects (e.g., non-personal enterprise objects). As illustrated in FIG. 1B, the electronic social networking platform is represented as a graph 150 of nodes 152 connected by edges. Each node 152 in the graph 150 represents a particular type of object in the electronic social networking platform. For example, nodes 152(a) and 152(b) represent user identity objects, while node 152(c) represents a non-personal enterprise object, nodes 152(d) represent location objects, and node 152(e) represents an event object.

An edge 154 that connects two nodes 152 represents a connection that has been formed between the two objects that are represented by the connected nodes 152. For example, the edges 154 that connect node 152(a) to nodes 152(b) represent connections that have been formed between the user identity represented by node 102(a) and the user identities represented by nodes 152(b). (For ease of reference, such a connection between two user identity objects in an electronic social networking platform may be referred to herein as a "friend" connection.)

Similarly, the edge 154 that connects node 152(a) to node 152(c) represents a connection between the user identity represented by node 152(a) and the non-personal enterprise object represented by node 152(c). (As discussed above, a user of an electronic social networking platform may form a connection to such a non-personal enterprise object in order to record an endorsement of the non-personal enterprise represented by the object. Therefore, for ease of reference, connections between a user identity object and a non-personal enterprise object in an electronic social networking platform may be referred to herein as an "endorsement" connection.)

Furthermore, the edges 154 that connect node 152(a) to nodes 152(d) represent connections that have been formed between the user identity represented by node 152(a) and the location objects represented by nodes 152(d). Depending on the electronic social networking platform, a user identity may be able to establish various different types of connections to location objects.

For example, in order to store a record of the user identity's hometown, the user identity may establish what may be referred to herein as a "hometown" connection to a location object that represents the user identity's hometown. Additionally or alternatively, in order to store a record of the user identity's current residence, the user identity may establish what may be referred to herein as a "current city" connection to a location object that represents the user identity's current residence.

Moreover, in order to store a record of a place the user identity visited (including geographic locations (e.g., such as cities, states, or countries) as well as commercial venues, local businesses or places (e.g., such as restaurants, retail stores, parks, train or bus stations, airports, etc.)), the user identity may establish what may be referred to herein as a check-in connection to a location object that represents a place that the user identity visited. In some cases, an electronic social networking platform may provide mechanisms that enable a user identity to manually check-in at a location. For example, a social networking platform may provide mechanisms that enable a user identity to manually define and/or search for a location object that corresponds to a location that the user identity is visiting (or has visited or plans to visit) and create a connection to the location object that corresponds to the location in order to check-in at the location. Additionally or alternatively, an electronic social networking platform may provide mechanisms that enable a user identity to check-in at a location in a more intelligent or automated fashion. For instance, a social networking platform may provide mechanisms that enable a user identity to check-in at a location using a mobile computing device (e.g., a smartphone or tablet computer) using global positioning system (GPS) and/or map data available to the mobile computing device.

Finally, the edge 154 that connects node 152(a) to node 152(e) represents a connection that has been formed between the user identity represented by node 152(a) and the event represented by event object 152(e). (For ease of reference, such a connection between a user identity object and an event object may be referred to herein as "event" connections.) There may be various different types of event connections between user identities and event objects in a social networking platform. For example, one type of an event connection between a user identity and an event object in a social networking platform may signify that the user identity is the host of the event. Another type of an event connection between a user identity and an event object in a social networking platform may signify that the user identity has been invited to the event. Still another type of event connection between a user identity and an event object in a social networking platform may signify that the user identity has registered with the electronic social networking platform that the user identity will be attending the event. Yet another type of event connection between a user identity and an event object in a social networking platform may signify that the user identity has registered with the electronic social networking platform that the user identity will not be attending the event. Still one more type of event connection between a user identity and an event object in a social networking platform may signify that the user identity has registered with the electronic social networking platform that the user identity tentatively will be attending the event.

In some electronic social networking platforms that enable user identities to form connections with object types like location objects, event objects, and interest objects (e.g., non-personal enterprise objects), such location objects, event objects, and/or interest objects (e.g., non-personal enterprise objects) each may be associated with one or more representatives. Furthermore, the electronic social networking platforms may enable these representatives to interact with the user identities to whom the objects are connected using the manifestation of the object within the electronic social networking platform.

For example, a non-personal enterprise object within an electronic social networking platform may be manifested as a "page" that provides information about the non-personal enterprise that the object represents, and the electronic social networking platform may enable one or more designated representatives associated with the "page" to share information and exchange electronic communications with the user identities connected to the non-personal enterprise object in a manner in which such shared information or exchanged communications appear to involve the "page" as opposed to an individual user identity. In one particular example, the electronic social networking platform may provide a mechanism that enables one or more representatives associated with the non-personal enterprise to broadcast an electronic message that is shared publicly with all (or some defined subset of all) of the user identities to which the non-personal enterprise object is connected.

Additionally or alternatively, an event object within an electronic social networking platform also may be manifested as an "event page" that provides information about the event the object represents (e.g., date, time, and location information for the event), and the electronic networking platform may enable one or more designated representatives associated with the event (e.g., the hosts) to share information and exchange electronic communications with user identities who have been invited to the event via the "event page." In some electronic social networking platforms, both personal user identities and non-personal enterprise objects (and their representatives) may be able to create and host events.

Electronic social networking platforms often enable user identities to maintain user profiles or other collections of data that include information about the user identities to whom they correspond. Such a profile for an individual user identity of an electronic social networking platform may include, among other information, information about the user identity's hometown, current residence, age, gender, relationship status, educational background, and/or professional background. Additionally or alternatively, the profile for an individual user identity of an electronic social networking platform may include records of various different interests of the user identity (e.g., endorsements of non-personal enterprises or other interests).

In some electronic social networking platforms, at least some of the profile information recorded for an individual user identity may be represented by connections between the user identity and other types of objects within the electronic social networking platforms. For example, information about a user identity's hometown and/or current residence may be represented as a connection between the user identity and one or more different location objects, for example, as described above in connection with FIG. 1B. Additionally or alternatively, information about a user identity's interests may be represented as connections between the user identity and one or more different interest objects (e.g., non-personal enterprise objects), for example, as also described above in connection with FIG. 1B.

Some electronic social networking platforms provide mechanisms that enable independent applications to leverage the electronic social networking platforms to provide services to client computing devices that are in addition to the services provided by the electronic social networking platforms themselves. One example of such an independent application is a social intelligence application. A social intelligence application may receive data from the electronic social networking platform that is available to different user identities of the electronic social networking platform. Thereafter, the social intelligence service may process the received content and represent the received content and/or generate reports about the received content so as to enable the individual user identities to glean better intelligence from the data that is available to them within the electronic social networking platform.

For example, as described in greater detail below, a social intelligence application may receive data about check-ins registered by a particular user identity and other user identities who are members of the particular user identity's social network from an electronic social networking platform. The social intelligence application then may process this received check-in data to determine statistics related to electronic social networking platform user interactions with different locations and categories of locations. Consequently, the social intelligence application may provide the particular user with statistics related to the number of locations represented by check-ins; the number of check-ins performed at each location and mapped to each category; the number of unique visitors among the received check-ins who visited each location; the total number of unique visitors represented in each category; the number of repeat visitors among the received check-ins who visited each location; the total number of unique visitors represented in each category; and/or the percentage of unique visitors at each location and in each category who were also repeat visitors.

The different examples of electronic social networking platforms described above may provide various different types of user interfaces for interacting with the electronic social networking platforms. In one particular example, an electronic social networking platform may provide multiple different GUIs to a user identity to enable the user identity to interact with the underlying electronic social networking platform.

Figure 2:
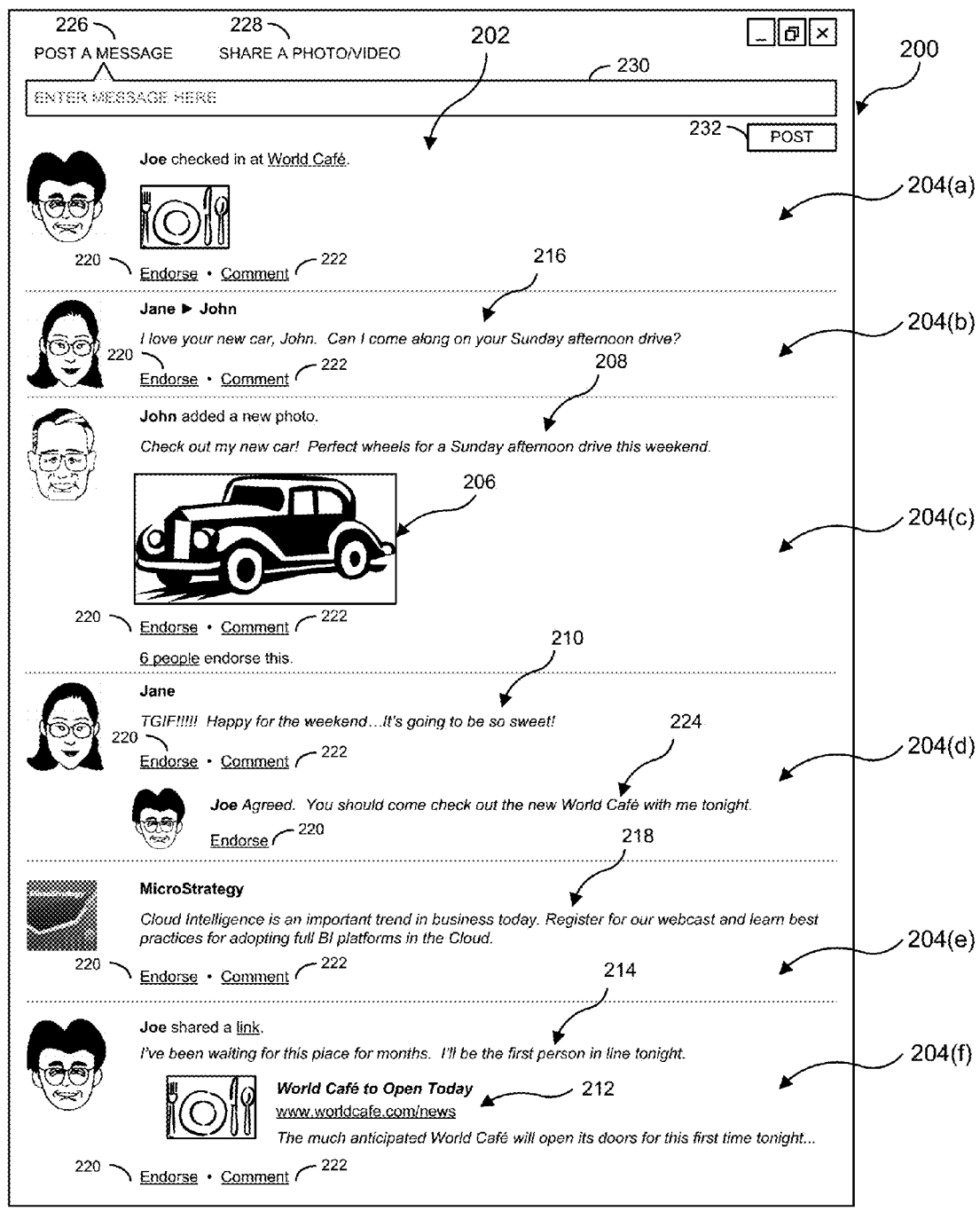
FIGS. 2 and 3 are diagrams of examples of graphical user interfaces (GUIs) for an example of an electronic social networking platform.

FIG. 2 is a diagram of an example of a GUI 200 for an example of an electronic social networking platform. The GUI 200 presented in FIG. 2 illustrates an example of a GUI that presents a particular user identity's "news feed" 202 as described above.

In this example, the electronic social networking platform may provide a first GUI to the user identity that (among other features) presents to the user identity a feed that includes: (i) electronic messages that have been shared with the user identity by other user identities who are members of the user identity's social network and/or by other types of objects (e.g., location, event, and interest objects) to which the user identity is connected; and/or (ii) information about activities engaged in within the context of the electronic social networking platform by other user identities who are members of the user identity's social network. (For ease of reference, this feed presented to a user identity in the first GUI provided by the electronic social networking platform may be referred to herein as the user identity's "news feed.")

In addition to the first GUI described above in connection with this example, the electronic social networking platform also may provide a second GUI to the user identity that (among other features) presents to the user identity a feed that includes: (i) electronic messages that have been shared by the personal user identity with members of the personal user identity's social network (either in a broadcast or a directed fashion); (ii) electronic messages that were shared with the user identity by members of the user identity's social network, or, in some cases by gaming applications that leverage the electronic social networking platform, and that were directed specifically to the user identity (that the user identity nevertheless may allow other members of the user identity's social network to view); and (iii) information about activities engaged in within the context of the electronic social networking platform by the user identity. (For ease of reference, this feed presented to a user identity in the second GUI provided by the electronic social networking platform may be referred to as the user identity's "personal feed.")

Referring to FIG. 2, GUI 200 includes a "news feed" 202 that includes different feed items 204. The items 204 included within "news feed" 202 include content and/or electronic messages that have been shared with the particular user identity by other user identities who are members of the particular user identity's social network. For example, item 204(c) includes a picture 206 and a corresponding message 208 shared with the particular user identity by a member of the particular user identity's social network identified as John. Similarly, item 204(d) includes a message 210 shared with the particular user identity by a member of the particular user identity's social network identified as Jane, and item 204(f) includes a hyperlink 212 to a web page and a corresponding message 214 shared with the particular user identity by a member of the particular user identity's social network identified as Joe. Although not illustrated in FIG. 2, in addition to enabling user identities to share pictures and hyperlinks with members of their social networks (e.g., as illustrated by items 204(c) and 204(f), respectively) the electronic social networking platform also may enable user identities to share other types of content with members of their social networks including, for example, videos.

Items 204(c), 204(d), and 204(f) may represent content and/or messages that the particular user identities who shared these items (i.e., John, Jane, and Joe, respectively) shared generally with multiple members of their own social networks. For ease of reference, messages and/or content that user identities share as general broadcast messages to multiple members of their social networks, such as, for example, picture 206 and corresponding message 208 of item 204(c), message 210 of item 204(d), and hyperlink 212 and corresponding message 214 of item 204(f), may be referred to herein as "status posts."

In addition to enabling user identities to send general broadcast messages to multiple members of their social networks, the electronic social networking platform also may enable user identities to send directed messages to individual user identities within their social networks. Such directed messages may be presented to the user identities to whom they are targeted within the targeted user identities' "personal feeds," and the electronic social networking platform may provide user identities with controls for configuring whether such directed messages also are shared with members of the targeted user identities' own social networks. In the event that a targeted user identity selects configuration settings that provide for directed messages to the targeted user to be shared with other members of the targeted user identity's social network, such directed messages may be presented to the other members of the targeted user identity's social network in their "news feeds."

Item 204(b) in the "news feed" 202 of the GUI 200 for a particular user identity of the electronic social networking platform is an example of a message 216 that was directed to a targeted user identity who is a member of the particular user identity's social network and who selected configuration settings that provided for the directed message to be shared with other members of the targeted user identity's own social network. More particularly, message 216 was directed to a member of the particular user identity's social network identified as John by another user identity identified as Jane. Because the user identity identified as John is a member of the particular user identity's social network and because the user identity identified as John selected configuration settings that provide for directed messages that target the user identity identified as John to be shared with other members of his social network, the directed message 216 from the user identity identified as Jane to the user identity identified as John is presented in the particular user identity's "news feed" 202. The user identity identified as Jane may or may not be a member of the particular user identity's own social network.

"News feed" 202 also includes information about activities engaged in within the context of the electronic social networking platform by other user identities who are members of the particular user identity's social network. For example, item 204(a) indicates that a user identity identified as Joe checked-in at a location identified as World Café. The location World Café may be represented as a location object within the electronic social networking platform and may correspond to, for example, a local restaurant.

The items 204 included within "news feed" 202 also include content and/or electronic messages that have been shared with the particular user identity by other types of objects (e.g., location, event, and interest objects) to which the user identity is connected. For example, item 204(e) includes a message 218 shared with the particular user identity by a non-personal enterprise object identified as MicroStrategy.

The items 204 presented in "news feed" 202 provide mechanisms that enable the particular user identity to react to the objects included within the items 204 presented in "news feed" 202. For example, as illustrated in FIG. 2, each of the items 204 presented in "news feed" 202 includes a selectable "Endorse" control 220 and a selectable "Comment" control 222. A selectable "Endorse" control 220 in an item 204 enables the particular user identity to register an endorsement of the object(s) (e.g., content, message, and/or activity) included in the item 204. The electronic social networking platform records such endorsements and may present the number of endorsements registered in connection with the object(s) presented in an item 204 in connection with the presentation of the item itself. For example, item 204(c) includes an indication that six different user identities have registered endorsements of the picture and message included in item 204(c).

A selectable "Comment" control 222 in an item 204 enables the particular user identity to enter a responsive comment to the object(s) included in the item 204. The electronic social networking platform records such responsive comments and associates them with the object(s) included in the item so that the electronic social networking platform may present any such responsive comments in connection with the presentation of the item 204 itself. For example, item 204(d) includes a message 224 by a user identity identified as Joe that was entered in response to the message 210 originally shared by the user identity identified as Jane.

In addition to "news feed" 202, GUI 200 also includes a selectable "Post Message" control 226, a selectable "Share Photo/Video" control 228, and an associated text entry field 230 and selectable "Post" control 232. Selectable "Post Message" control 226 enables the particular user identity to compose and post a status message by entering text in associated text entry field 230 and invoking selectable "Post" control 232. Similarly, selectable "Share Photo/Video" control 228 enables the particular user identity to share a picture or a video and to compose and post a corresponding status message by entering text in associated text entry field 230 and invoking selectable "Post" control 232.

Although not illustrated a "personal feed" is similar to the "news feed" but may include different feed items. The items included within a "personal feed" may include content and/or electronic messages that the particular user identity shared with other members of the particular user identity's social network. Such content and/or electronic messages may include status posts that the particular user identity broadcasted generally to multiple members of the particular user identity's social network, responsive comments that the particular user identity entered in response to content and/or messages shared by other user identities who are members of the particular user identity's social network, and directed messages that the particular user identity shared with specifically targeted individual user identity's who are members of the particular user identity's social network.

Figure 3:
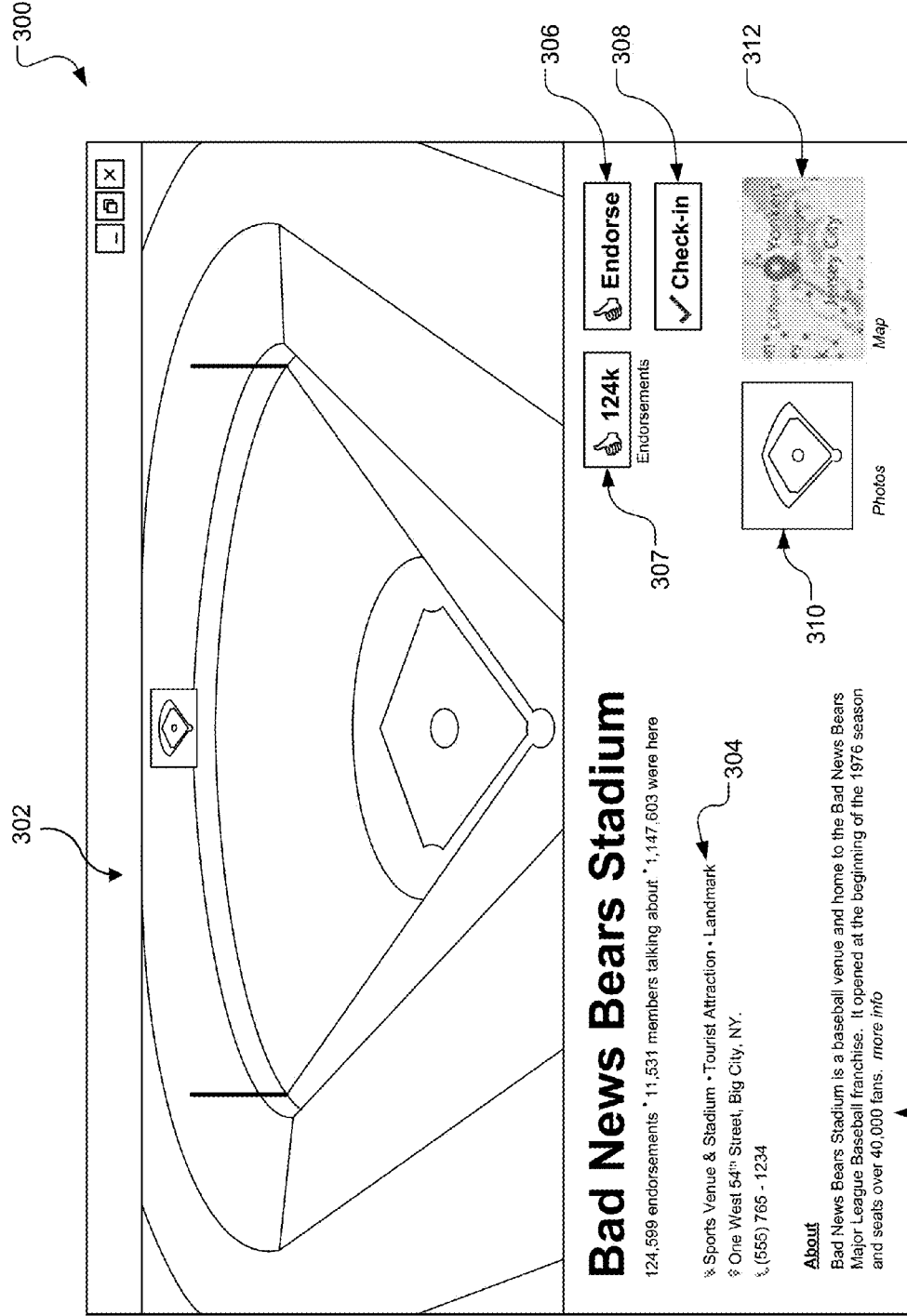

As discussed above, in some electronic social networking platforms, locations may be represented as location objects that are manifested within the electronic social networking platform as "pages." FIG. 3 is a diagram of an example of a GUI 300 for an example of an electronic social networking platform within which locations are represented as location objects that are manifested within the electronic social networking platform as pages. More particularly, GUI 300 is displaying a representation of a location object 302 for a location identified as Bad News Bears Stadium. As illustrated in FIG. 3, the Bad News Bears Stadium page includes an information section 303 that provides background information about Bad News Bears Stadium. The information section 303 may contain tags 304 (e.g., sports venue & stadium, tourist attraction, and landmark) associated with the location identified by the location object 302, contact information for the location, and a brief description of the location venue. In some instances, the information section 303 may be longer than the space available for text, in which case the information section 303 may include a link (e.g., "more info") to a more detailed description of the location. The Bad News Bears Stadium location object 302 also includes tags 304 that briefly describe or identify the location represented in the location object 302 in a word or phrase, such as, Sports Venue & Stadium, Tourist Attraction, or Landmark. Although not illustrated as such in FIG. 3, a location object may also include various additional or alternative types of content.

Bad News Bears Stadium location object 302 also includes a selectable "Endorse" control 306 that enables user identities who view the Bad News Bears Stadium location object 302 and who have not already endorsed Bad News Bears Stadium to record an endorsement of Bad News Bears Stadium as one of their interests. In response to invocation of selectable endorse control 306 by a particular user identity, the electronic social networking platform records that the particular user identity has endorsed Bad News Bears Stadium as an interest, for example, by establishing a connection between the object that represents the particular user identity in the platform and the interest object that represents Bad News Bears Stadium within the electronic social networking platform. Bad News Bears Stadium location object 302 also includes an indication 307 reporting that 124,000 user identities already have endorsed Bad News Bears Stadium within the electronic social networking platform. In addition, a location object 302 may include thumbnail images (310 and 312) with links to photos 310 and maps 312. For example, Bad News Bears Stadium location object 302 includes thumbnail images (310 and 312) with links to photos 310 of the stadium and events held at the stadium as well as a map 312 of the area surrounding Bad News Bears Stadium.

Bad News Bears Stadium location object 302 also includes a selectable "Check-in" control 308 that enables user identities who view the Bad News Bears Stadium location object 302 to indicate that they visited the stadium by checking-in with the location object 302. The social networking platform also may record a user identity check-in when the platform identifies that a specific user identity interaction with the social networking platform has originated from a particular location. For instance, a user may take a family picture on his smartphone at Bad News Bears Stadium and post the picture within the social networking platform from the game. If the social networking platform identifies that the picture was posted from the Bad News Bears Stadium (e.g., via cellular triangulation or GPS), the platform may record a check-in for the user's social networking platform user identity at the stadium. In addition, the social networking platform may use a post, picture, or video posted by one user identity to record a check-in for a second user identify who was tagged in the first user identity's posted post, picture, or video. Continuing the prior example, if the user tags his child in the picture that he posted to the social networking platform at Bad News Bears Stadium, the social networking platform may record a check-in at the stadium for the child's social networking platform user identity.

In some electronic social networking platforms, interests endorsed and/or locations checked-in at by a particular user identity may be shared with or otherwise made available to other user identities of the electronic social networking platform. In particular, in some electronic social networking platforms, interests endorsed and/or locations checked-in at by a particular user identity may be shared with other user identities who are members of the particular user identity's social network.

Figure 4:
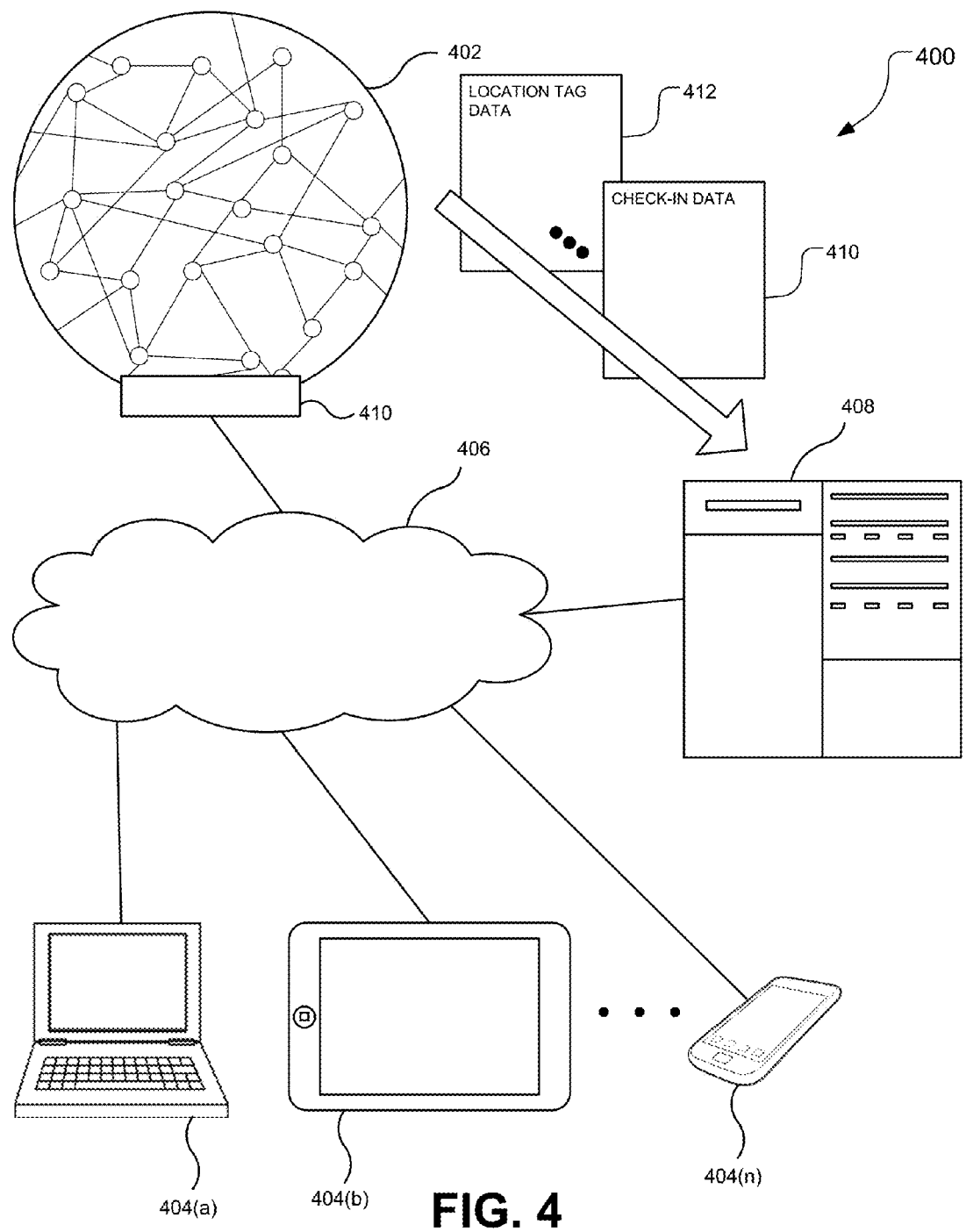
FIG. 4 shows an example of a system that provides communications among an electronic social networking platform, a social intelligence application, and various computing devices.

FIG. 4 shows an example of a system 400 that provides communications among an electronic social networking platform, a social intelligence application, and various computing devices. For illustrative purposes, several elements illustrated in FIG. 4 and described below are represented as monolithic entities. However, these elements each may include and/or be implemented on numerous interconnected computing devices and other components that are designed to perform a set of specified operations.

As illustrated in FIG. 4, system 400 includes an electronic social networking platform 402 that is accessible to a number of computing devices 404(a)-404(n), including, for example, a laptop computer 404(a), a tablet computer 404(b), and a smartphone 404(n), over a network 406. In addition, system 400 also includes a computing system 408 that hosts a social intelligence application. Computing system 408 may be external to electronic social networking platform 402. As such, electronic social networking platform 402 may be accessible to computing system 408 over network 406. Alternatively or additionally, in some implementations the social intelligence application may be hosted by the electronic social networking platform 402. Additionally, computing system 408 may be accessible to computing devices 404(a)-404(n) over network 406.

Electronic social networking platform 402 may be implemented using one or more computing devices (e.g., servers) configured to provide a service to one or more client devices (e.g., computing devices 404(a)-404(n)) connected to electronic social networking platform 402 over network 406. The one or more computing devices on which electronic social networking platform 402 is implemented may have internal or external storage components storing data and programs such as an operating system and one or more application programs. The one or more application programs may be implemented as instructions that are stored in the storage components and that, when executed, cause the one or more computing devices to provide the features of an electronic social networking platform 402. Furthermore, the one or more computing devices on which electronic social networking platform 402 is implemented each may include one or more processors for executing instructions stored in storage and/or received from one or more other electronic devices, for example over network 406. In addition, these computing devices also typically may include network interfaces and communication devices for sending and receiving data. Electronic social networking platform 402 also may provide an application programming interface (API) 410 that enables other applications to interact with and receive data from the electronic social networking platform 402.

Computing devices 404(a)-404(n) may be any of a number of different types of computing devices including, for example, mobile phones; smartphones; personal digital assistants; laptop, tablet, and netbook computers; and desktop computers including personal computers, special purpose computers, general purpose computers, and/or combinations of special purpose and general purpose computers. Each of the computing devices 404(a)-404(n) typically may have internal or external storage components for storing data and programs such as an operating system and one or more application programs. In particular, the internal or external storage components for each of the computing devices 404(a)-404(n) may store a client application for interfacing with electronic social networking platform 402 and/or a client application for interfacing with computing system 408. Additionally or alternatively, computing devices 404(a)-404(n) may be configured to interface with electronic social networking platform 402 or computing system 408 without a specific client application, using, for example, a web browser.

Each of the computing devices 404(a)-404(n) also typically may include a central processing unit (CPU) for executing instructions stored in storage and/or received from one or more other electronic devices, for example over network 406. Each of the computing devices 404(a)-404(n) also usually may include one or more communication devices for sending and receiving data. One example of such communications devices is a modem. Other examples include antennas, transceivers, communications cards, and other network adapters capable of transmitting and receiving data over a network (e.g., network 406) through a wired or wireless data pathway.

Network 406 may provide direct or indirect communication links between electronic social networking platform 402, computing devices 404(a)-404(n), and computing system 408. Examples of network 406 include the Internet, the World Wide Web, wide area networks (WANs), local area networks (LANs) including wireless LANs (WLANs), analog or digital wired and wireless telephone networks, radio, television, cable, satellite, and/or any other delivery mechanisms for carrying data.

Computing system 408 hosts a social intelligence application. As such, computing system 408 is configured to receive and process data from one or more electronic social networking platforms (e.g., electronic social networking platform 402). For example, computing system 408 may be configured to exploit API 410 to receive data from electronic social networking platform 402. Among other features, computing system 408 may be configured to receive data about multiple different user identities' social networks including information about locations where each user identity has checked-in.

Computing system 408 may be implemented using one or more computing devices (e.g., servers). The one or more computing devices on which computing system 408 is implemented may have internal or external storage components storing data and programs such as an operating system and one or more application programs. The one or more application programs may be implemented as instructions that are stored in the storage components and that, when executed, cause the one or more computing devices to provide the features ascribed herein to the computing system 408. Furthermore, the one or more computing devices on which computing system 408 is implemented each may include one or more processors for executing instructions stored in storage and/or received from one or more other electronic devices, for example, over network 406. In addition, these computing devices also typically may include network interfaces and communication devices for sending and receiving data.

In some implementations, electronic social networking platform 402 may enable individual user identities to grant computing system 408 a token that defines permission levels related to data about the user identities' social networks that computing system 408 may access, extract, and receive from electronic social networking platform 402. For each individual user identity for which computing system 408 has a token, computing system 408 may receive information about the user identity and the other user identities who are members of the user identity's social network. This information may include identifying information for the user identity and each member of the user identity's social network as well as demographic information for the user identity and each member of the user identity's social network (e.g., hometown, current residence, age (or date of birth), gender, relationship status, etc.). For each individual user identity for which computing system 408 has a token, computing system 408 also may receive communications that the user identity shared with other user identities as well as communications that have been shared with the user identity. In addition, for each individual user identity for which computing system 408 has a token, computing system 408 also may receive information about locations where the user identity has checked-in (i.e., check-in information). Additionally or alternatively, for each individual user identity for which computing system 408 has a token, computing system 408 also may receive communications that members of the user identity's social network have shared with other user identities as well as communications that other user identities shared with members of the user identity's social network. In addition, for each individual user identity for which computing system 408 has a token, computing system 408 also may receive information locations where members of the user identity's social network have checked-in (i.e., check-in information).

Check-in information may include data associated with a plurality of check-ins 410 performed by either the user identity or members of the user identity's social network. For example, the data associated with check-ins 410, check-in information, may include user identities that performed the check-ins, identities (e.g., names) of the locations at which a check-in occurred, and/or a date and time when the check-in was recorded.

As described in more detail below in connection with FIG. 5, after receiving data from electronic social networking platform 402, computing system 408 may map the data associated with the check-ins 410 into categories used by the social intelligence application to classify the locations identified by the check-ins 410. The computing system 408 may access a mapping of tags 402 used by the electronic social networking platform to classify locations within the social networking platform 402 to categories within a list of categories used by the social intelligence application. Using the mapping, the computing system 408 may then determine one or more categories with which to associate the data associated with each of the received check-ins 410. For example, computing system 408 may map all of the following tags assigned to locations within the electronic social networking platform 402 to a category labeled "Restaurant and Takeout" employed by the social intelligence application: Pizza Restaurant, American Restaurant, Mexican Restaurant, Chinese Restaurant, etc. In some cases, all tags associated with a location will map to a single category. However, instances may occur in which a location is associated with multiple tags 412 two or more of which may be mapped to different categories (as described in more detail below with respect to FIG. 5). For example, the Bad News Bears Stadium location may be associated with three tags: a Sports Venue & Stadium tag, a Tourist Attraction tag, and a Landmark tag. The first tag may be mapped to a Sports & Events Venue category, while both of the other tags may be mapped to a Visitor Attraction category. In some implementations, computer system 408 may attempt to identify a single category from among the more than one mapped categories with which to associate the check-in data 410 (e.g., the most accurate and/or specific category from among the multiple mapped categories).

Computing system 408 may then store the mapped check-in data in one or more databases. For example, computing system 408 may store data associated with the plurality of check-ins from electronic social networking platform 402 in association with the identified category for each check-in in one or more databases. Such databases may be implemented as relational or other forms of databases. Computing system 408 then may process the received data stored in the database(s) and load the processed data into a data warehouse that may facilitate reporting and analysis of the processed data.

Computing system 408 then may provide individual user identities for which computing system 408 has tokens with access to all of the processed data or subsets of the processed data that correspond to data received from electronic social networking platform 402 using their tokens. For example, for each individual user identity for which computing system 408 has a token, computing system 408 may process check-in data received from the electronic social networking platform 402. In return for granting the token, the computing system 408 then may provide the individual user identities with access to a GUI (e.g., as shown and described in connection with FIGS. 6A and 6B) displaying the processed check-in data received from the electronic social networking platform 402. Furthermore, the application may enable various other third parties to analyze the data received from the electronic social networking platform and processed by the social intelligence application. For example, some implementations may allow a third party to purchase access to the social intelligence application (e.g., an entrepreneur performing market research).

The individual user identities may utilize various different computing devices (e.g., computing devices 404(a)-404(n)) communicatively coupled to computing system 408 via network 406 to access the subsets of the processed data made available to the user identities by computing system 408. In addition to providing individual user identities with access to the processed data, computing system 408 also may provide these individual user identities with various analysis and reporting tools for manipulating the data included within the social intelligence application categories. Additionally or alternatively, such analysis and reporting tools may be provided within a client application resident on a computing device that an individual user identity uses to access the processed data made available by computing system 408.

Among other reporting and analysis tools, computing system 408 (and/or the client application used to access computing system 408) may provide the user identities with filtering tools that enable the user identity to identify check-in data 410 for different segments of user identities (e.g., based on geographic location of check-ins, demographic characteristics such as age, gender, and/or relationship status of user identities who performed check-ins). Furthermore, some implementation also may allow users to analyze social trends within particular locations or the popularity of different categories of locations.

A social intelligence application that provides individual user identities of an electronic social networking platform with access to the received and processed data as described above and/or that provides the individual user identities with reporting and analysis tools for manipulating such received and processed data may enable the individual user identities to glean better intelligence from the wealth of data available to them within the electronic social networking platform.

Figure 5:
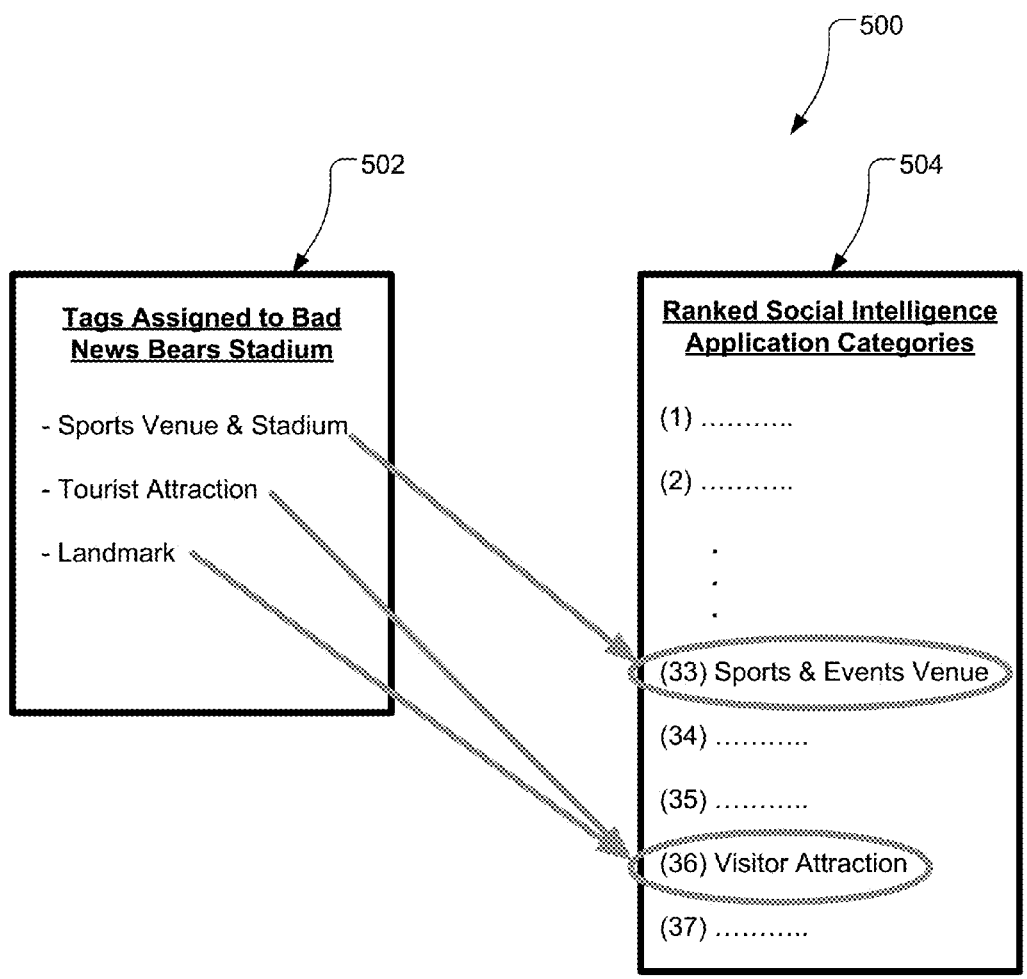
FIG. 5 is an example mapping of social networking platform tags to social intelligence application categories.

FIG. 5 is an example mapping 500 of social networking platform tags 502 to social intelligence application categories 504. An electronic social networking platform may employ many (e.g., over 7000) different tags to identify locations within the social networking platform. The mapping 500 illustrates an example of how a social intelligence application may condense the number of tags into a smaller number of categories, for example, 43 different categories. The mapping 500 relates individual tags used by the electronic social networking platform to describe locations within the social networking platform to one category 504 within a list of categories (e.g., Table 1) used by the social intelligence application to classify the locations. Put differently, each tag 502 in the mapping 500 may be mapped to a single category 504 within the list of categories 504. For instance, a tag "Sports Venue & Stadium" may be mapped to a category "Sports & Events Venue." Likewise, the tags "Tourist Attraction" and "Landmark" may be mapped to the category "Visitor Attraction." In some implementations the mapping 500 of tags to categories may be generated manually, for example. Alternatively, the mapping 500 may be generated by a computer algorithm. In some implementations, the categories 504 may be listed in a ranked order, for example, as shown in Table 1.

TABLE 1

| | Category Ranking |
|---|---|
| 1 | Adult Entertainment |
| 2 | Casino |
| 3 | Nightclub |
| 4 | Luxury Resort/Cruise |
| 5 | Restaurant and Takeout |
| 6 | Bar/Pub |
| 7 | Hotel/Lodging |
| 8 | Grocery Store |
| 9 | Coffee/Tea Shop & Bakery |
| 10 | Club/Association |
| 11 | Conference & Convention Center |
| 12 | Movie Theater |
| 13 | School |
| 14 | Library |
| 15 | Child Care |
| 16 | Museum & Art Gallery |
| 17 | Zoo & Aquarium |
| 18 | Churches & Religious Places |
| 19 | Pet & Animal Services |
| 20 | Music Shop/Bookstore |
| 21 | Airport |
| 22 | Train & Bus Station |
| 23 | Automotive |
| 24 | Military Facility |
| 25 | Medical Facility |
| 26 | Performance & Entertainment |
| 27 | Community & Government Services |
| 28 | Sports & Fitness |
| 29 | Education & Training |
| 30 | Beauty & Wellness |
| 31 | Brewery & Winery |
| 32 | Shopping & Retail |
| 33 | Sports & Events Venue |
| 34 | Outdoor Recreation |
| 35 | Amusement |
| 36 | Visitor Attraction |
| 37 | Residence |
| 38 | Workplace |
| 39 | City |
| 40 | Products & Services |
| 41 | Organization Other |
| 42 | Transportation Other |
| 43 | Other |

The social intelligence application may access the mapping 500 of tags 502 to categories 504 to determine one or more categories in which to classify the data associated with each of the received check-ins. As mentioned above, situations may occur in which a location associated with a check-in is associated with multiple tags two or more of which map to different categories. For example, as illustrated in FIGS. 3 and 5, there are three tags assigned to the venue Bad News Bears Stadium: Sports Venue & Stadium, Tourist Attraction, and Landmark. One tag, Sports Venue & Stadium, maps to the category Sports & Events Venue, while the other two tags, Tourist Attraction and Landmark, both map to the category Visitor Attraction. Double mapping of a single location to multiple categories, as such, may produce inaccuracies within aggregated check-in data by artificially increasing data associated with one or more categories within the social intelligence application. To alleviate this problem, the social intelligence application may identify a single category from among the more than one mapped categories (e.g., Sports & Events Venue and Visitor Attraction) with which to associate the double mapped check-in data.

In some implementations, the list of social intelligence application categories 504 is ranked (e.g., Table 1) and the highest ranked among the more than one mapped categories for a location is chosen as the category with which to associate the location. Thus Bad News Bears Stadium would be associated with the Sports & Events Venue category because Sports & Events Venue is ranked higher than Visitor Attraction, for example. Category ranking may be performed manually or by a computer algorithm in various implementations. Alternatively or in addition, the social intelligence application may classify the check-in with the category having the highest number of corresponding tags. Thus, in the example shown in FIG. 5, a check-in at Bad News Bears Stadium would map to the Visitor Attraction category rather than the Sports & Events Venue category because two of the stadium's three tags map to the Visitor Attraction category. Some implementations may even use a hybrid of the two methods by, for example, choosing a category for a check-in based on the category's rank as a tie-breaker if an equal number of tags map to two different categories.

Alternatively or in addition, the social intelligence application may analyze information associated with the location to identify a single category from among the more than one mapped categories (e.g., the one category perceived as being most accurate). Information associated with the location may include data associated with the check-in that identified the location or information from a location object 302 related to the location. For example, the social intelligence application may access the Bad News Bears Stadium location object 302 to determine, based on a textual analysis of the information section 303, that Sports & Events Venue is the most accurate category from among the two mapped categories (Sports &

Events Venue and Visitor Attraction) with which to associate data associated with a Bad News Bears Stadium check-in.

Figure 6A:
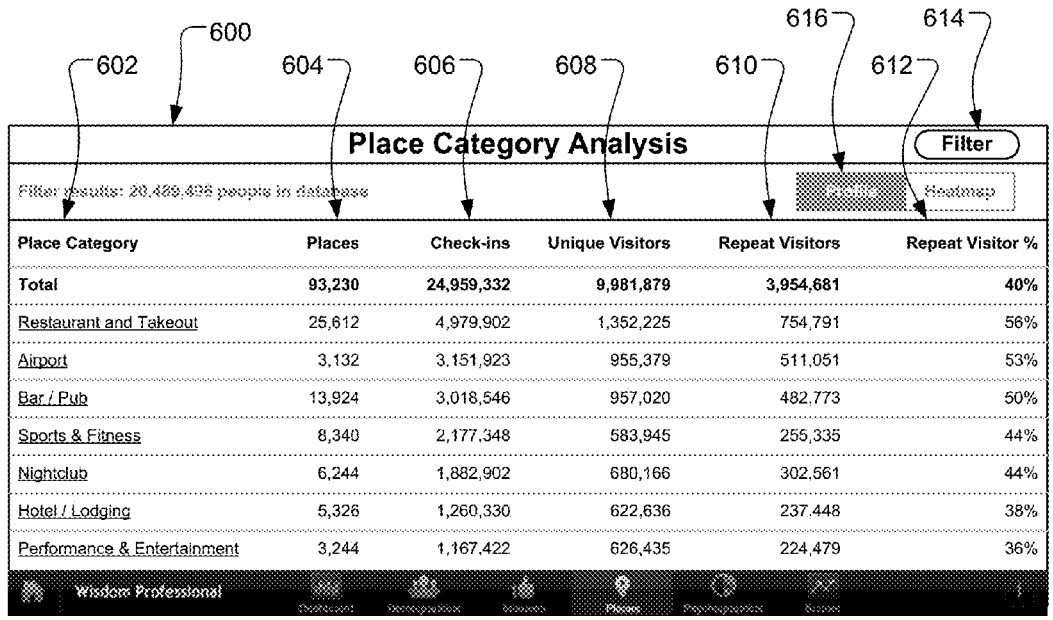
FIGS. 6A and 6B are diagrams of examples of a GUI for a social intelligence application that analyzes the interactions of user identities of an electronic social networking platform with locations.
Figure 6B:
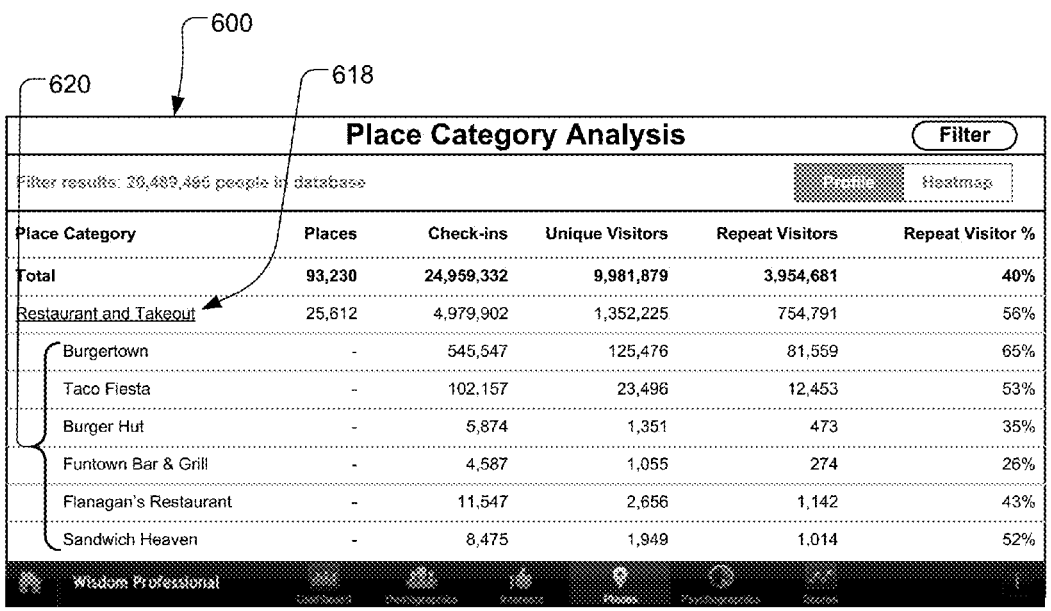

FIGS. 6A and 6B are diagrams of examples of a GUI 600 for a social intelligence application that analyzes the interactions of user identities of an electronic social networking platform with locations.

Referring first to FIG. 6A, GUI 600 provides an aggregated view of data associated with check-ins performed by user identities of an electronic social networking platform. In particular, GUI 600 presents a list of categories (column 602) that are used to classify various locations (column 604) at which user identities have performed check-ins (column 606) in the electronic social networking platform. In addition, GUI 600 presents various different statistics about each of the listed categories and locations represented within each category.

More particularly, GUI 600 presents the number of unique visitors (column 608) represented by check-ins at each location within each category; the number of repeat visitors (column 610) represented by check-ins at each location within each category; and the percentage of visitors who were repeat visitors (column 612) represented by check-ins at each location within each category.

After receiving check-in data from the electronic social networking platform and mapping locations to appropriate categories, the social intelligence application processes this data to, among other things, count the number of locations represented by check-ins; and the number of check-ins performed at each location and mapped to each category. Alternative or additional processing, by the social intelligence application, may include using the data associated with the received check-ins (e.g., user identity information) to determine a set of user identities that have performed at least two check-ins at a particular location and storing information identifying the set of users as repeat visitors at that particular location. For example, a user identity for John Smith may register a check-in at Bad News Bears Stadium at both time A and time B. After mapping the check-in registered at time B with the category Sports & Events Venue, the social intelligence application may recognize that John Smith's user identity had also performed a check-in at time A. As a result, the social intelligence application may identify John Smith's user identity as a repeat visitor at Bad News Bear Stadium within the category Sports & Events Venue. Alternatively or in addition, the social intelligence application may increment a number of repeat visitors to Bad News Bears Stadium and recognize that only one check-in performed by John Smith's user identity should be included in a number of unique visitors to Bad News Bears Stadium. In some implementations, the social intelligence application may use the above described repeat visitor analysis to count the number of unique visitors among the received check-ins who visited each location; the total number of unique visitors represented in each category; the number of repeat visitors among the received check-ins who visited each location; the total number of unique visitors represented in each category; and/or the percentage of unique visitors at each location and in each category who were also repeat visitors.

In some implementations, the categories presented within the view provided by GUI 600 as illustrated in FIG. 6A may extend beyond the visible borders of the GUI 600. Consequently, GUI 600 may enable a user to scroll the view up or down in order to see additional categories presented by the GUI 600 in the view illustrated in FIG. 6A. Furthermore, GUI 600 provides selectable controls that enable the particular user identity to whom GUI 600 is presented to specify filters that should be applied to the user identities for whom the social intelligence application presents activity statistics within GUI 600. More particularly, GUI 600 provides a selectable "Filter" control 614.

In response to a user selection of the selectable "Filter" control 614, GUI 600 may present a filter menu (not shown) that provides controls to enable the particular user identity to specify that data represented in the GUI 600 should be filtered according to one or more different characteristics of the user identities who performed check-ins, including, for example: (i) the city, state, and/or country of the user identities who performed check-ins at locations mapped to the categories; (ii) the ages of the user identities who performed check-ins at locations mapped to the categories; (iii) the genders of the user identities who performed check-ins at locations mapped to the categories; and (iv) the relationship status of the user identities who performed check-ins at locations mapped to the categories. In response to manipulation of the filter controls provided within filter menu by the particular user identity, the social intelligence application accesses check-in data, filters the information to include only data related to user identities who satisfy the criteria specified by the particular user identity using filter menu, and recalculates the tallied data in each column.

Referring now to FIG. 6B, in some implementations of a social intelligence application, each category listed in column 602 may be selectable by a particular user of the social intelligence application. In such implementations, when a particular category 618 is selected, a list of locations and associated data relevant to each column in GUI 600 may be revealed, e.g., in a nested folder format 620. The data displayed along with each of the locations 620 in the selected category 618 may include, for example, the number of check-ins performed at each location; the number of unique visitors among the received check-ins who visited each location; the number of repeat visitors among the received check-ins who visited each location; and/or the percentage of unique visitors at each location who were also repeat visitors.

Figure 7:
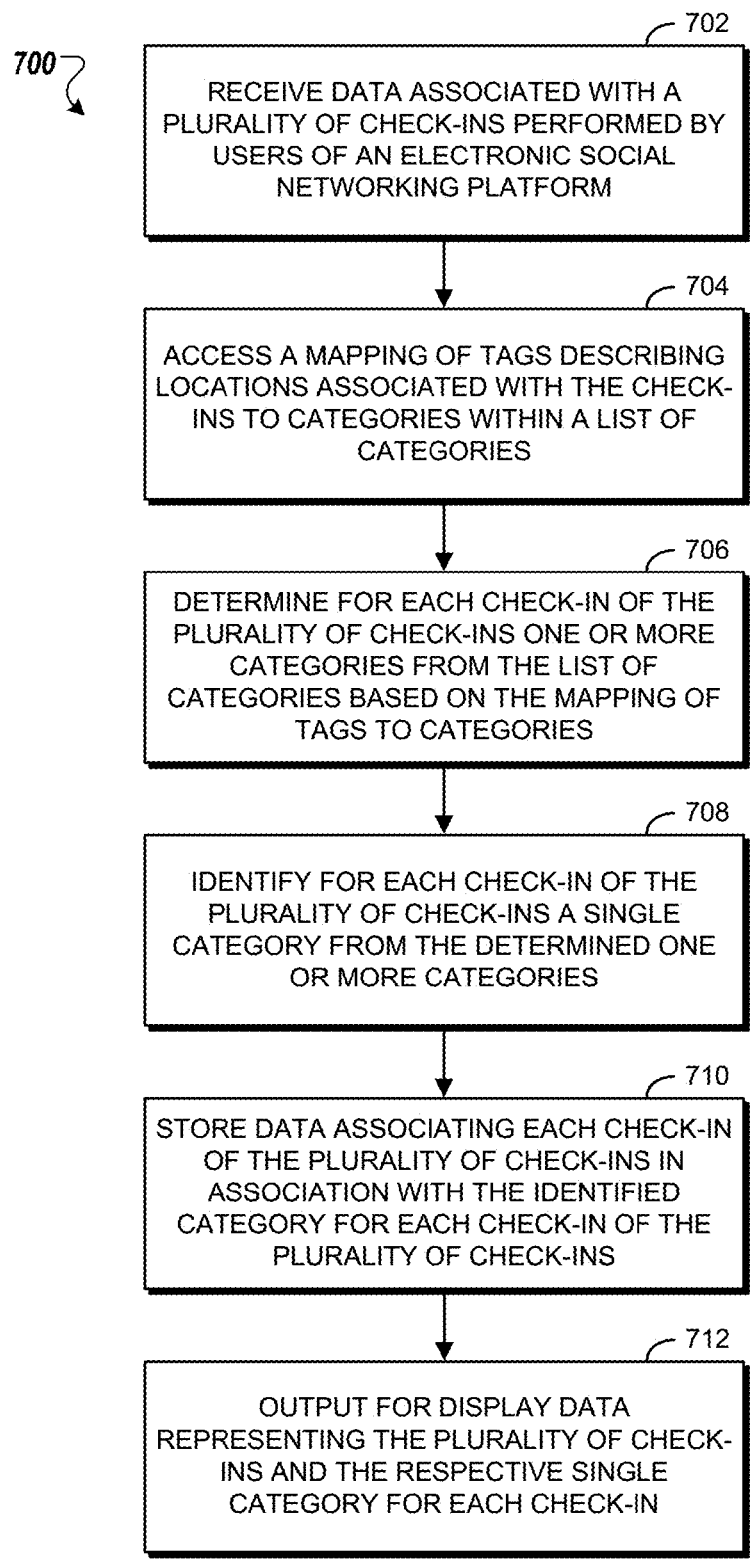
FIG. 7 illustrates an example process for categorizing places in a social networking platform.

FIG. 7 illustrates an example process 700 for categorizing places in a social networking platform. The process 700 may be performed by a computing system, such as, for example, computing system 408 of FIG. 4.

The computing system receives data associated with a plurality of check-ins performed by users of an electronic social networking platform (702). Data associated with the plurality of check-ins may include information about locations where user identities within the electronic social networking platform have checked-in, for example, identities (e.g., names) of the locations at which the check-ins occurred, tags associated with the locations within the social networking platform, and/or the date and time that the check-in was recorded by the social networking platform. For example, the tags Sports Venue & Stadium, Tourist Attraction, and Landmark may be received in connection with check-ins performed by user identities at Bad News Bears Stadium.

Next, the computing system accesses a mapping of tags describing locations associated with the check-ins to categories within a list of categories (704). For instance, the mapping may map tags used by the electronic social networking platform to describe locations represented within the electronic social networking platform to categories from a list of categories, and each tag in the mapping may be mapped to a single category within the list of categories (e.g., as described above in connection with FIG. 5). For example, the mapping may include categories such as Sports & Events Venue and Visitor Attractions. The computing system then determines, for each check-in of the plurality of check-ins, one or more categories from the list of categories based on the mapping of tags to categories (706), and identifies for each check-in of the plurality of check-ins a single category from the determined one or more categories (708). For instance, the computing system may identify the category based on choosing the highest ranked category from among the one or more categories and/or by choosing the category from among the one or more categories to which the most tags are mapped (e.g., as described above in connection with FIG. 5). Alternatively or in addition, the computing system may analyze information associated with the location to identify the category from among the more than one mapped categories (e.g., as described above in connection with FIG. 5). For example, the Sports Venue & Stadium tag may map to a category labeled Sports & Events Venue while the Tourist Attractions tag and the Landmark tag map to a category labeled Visitor Attractions. And the computing system may identify the Sports & Events Venue category as a proper category for a Bad News Bears Stadium check-in because it is ranked higher than the Visitor Attraction category.

After identifying the single category for each check-in, the computing system stores data associating each check-in of the plurality of check-ins in association with the identified category for each check-in of the plurality of check-ins (710). The data associated with each check-in and the data associating each received check-in with its identified category may be stored in one or more databases for further processing and/or display (e.g., as described above in connection with FIG. 4). For example, the computing system stores the Bad News Bear Stadium check-in in association with the Sports & Events Venue category.

Lastly, the computing system outputs for display data representing the plurality of check-ins and the respective single category for each check-in (712). For instance, the computing system may output the number of locations represented by check-ins (e.g., as described above in connection with FIG. 6A); the number of check-ins performed at each location and mapped to each category (e.g., as described above in connection with FIG. 6A); the number of unique visitors among the received check-ins who visited each location (e.g., as described above in connection with FIG. 6B); the total number of unique visitors represented in each category (e.g., as described above in connection with FIG. 6A); the number of repeat visitors among the received check-ins who visited each location (e.g., as described above in connection with FIG. 6B); the total number of unique visitors represented in each category (e.g., as described above in connection with FIG. 6A); and/or the percentage of unique visitors at each location and in each category who were also repeat visitors (e.g., as described above in connection with FIGS. 6A and 6B).

The techniques described herein can be implemented in digital electronic circuitry, or in computer hardware, firmware, software, or in combinations of them. The techniques can be implemented as a computer program product, i.e., a computer program tangibly embodied in an information carrier, e.g., in a machine-readable storage device, in machine-readable storage medium, in a computer-readable storage device or, in computer-readable storage medium for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps of the techniques can be performed by one or more programmable processors executing a computer program to perform functions of the techniques by operating on input data and generating output. Method steps can also be performed by, and apparatus of the techniques can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, such as, magnetic, magneto-optical disks, or optical disks. Information carriers suitable for embodying computer program instructions and data include all forms of non-volatile memory, including by way of example semiconductor memory devices, such as, EPROM, EEPROM, and flash memory devices; magnetic disks, such as, internal hard disks or removable disks; magneto-optical disks; and CD-ROM and DVD-ROM disks. The processor and the memory can be supplemented by, or incorporated in special purpose logic circuitry.

A number of implementations of the techniques have been described. Nevertheless, it will be understood that various modifications may be made. For example, although various techniques generally are disclosed herein as being performed externally to an electronic social networking platform, in some implementations, the techniques disclosed herein may be performed internally by an electronic social networking platform.

Furthermore, it should be noted that for situations in which the systems discussed herein collect personal information about users, the users may be provided with an opportunity to opt in/out of programs or features that may collect personal information (e.g., information about a user's preferences or a user's current location). In addition, certain data may be anonymized in one or more ways before it is stored or used, so that personally identifiable information is removed. For example, a user's identity may be anonymized.

The invention claimed is:

1. A computer-implemented method comprising:
receiving, by one or more processors, data associated with a plurality of check-ins performed by users of an electronic social networking platform, the received data indicating, for each check-in of the plurality of check-ins, (i) a location of the check-in, and (ii) two or more different tags associated with the location within the electronic social networking platform that are used by the electronic social networking platform to describe the location;
accessing, by the one or more processors, a mapping of tags used by the electronic social networking platform to describe locations represented within the electronic social networking platform to categories from a list of multiple categories, wherein each tag is mapped to a single category within the list of multiple categories, wherein the list of multiple categories comprises a ranking;

determining for each check-in of the plurality of check-ins, by the one or more processors, one or more categories from the list of multiple categories based on the mapping of tags to categories;

identifying for each check-in of the plurality of check-ins, by the one or more processors, a single category from the determined one or more categories for the check-in,
wherein multiple different categories from the list of multiple categories were determined for a particular check-in of the plurality of check-ins, each of the multiple different categories corresponding to a different one of the two or more different tags associated with the location of the particular check-in; and
wherein identifying the single category for the particular check-in comprises selecting a highest ranking single category for the location of the particular check-in from among the multiple different categories based on the ranking of the list of multiple categories;

storing, by the one or more processors, data associating each check-in of the plurality of check-ins in association with the identified category for the check-in; and outputting for display, from the one or more processors, data representing the plurality of check-ins and the respective single category for each check-in.

2. The method of claim 1, wherein identifying for each check-in of the plurality of check-ins, by the one or more processors, a single category from the determined one or more categories comprises analyzing information associated with the location of the respective check-in to identify the single category from the determined one or more categories.

3. The method of claim 1, wherein receiving, by one or more processors, data associated with a plurality of check-ins performed by users of an electronic social networking platform, each check-in of the plurality of check-ins identifying a location and two or more tags associated with the location within the electronic social networking platform that are used by the electronic social networking platform to describe the location comprises receiving, by one or more processors, data associated with a plurality of check-ins performed by users of an electronic social networking platform, each check-in of the plurality of check-ins identifying a location and two or more tags associated with the location within the electronic social networking platform that are used by the electronic social networking platform to describe the location, and including one or more of a name of the location, an identity of the user of the electronic social networking platform who performed the check-in, and a date that the check in was recorded with the social networking platform.

4. The method of claim 1, further comprising:
determining, by the one or more processors, that a set of users of the electronic social networking platform has performed at least two check-ins at a particular location; and
storing, by the one or more processors, information identifying the set of users as repeat visitors of the particular location, and
wherein outputting for display, from the one or more processors, data representing the plurality of check-ins and the respective single category for each check-in comprises outputting for display, from the one or more processors, data representing the plurality of check-ins and the respective single category for each check-in including information identifying the repeat visitors.

5. The method of claim 4, wherein outputting for display, from the one or more processors, data representing the plurality of check-ins and the respective single category for each check-in including information identifying the set of repeat visitors comprises outputting for display, from the one or more processors, data representing the plurality of check-ins and the respective single category for each check-in including information identifying unique visitors for the category.

6. The method of claim 1, further comprising:
receiving, by the one or more processors, a user selection of a category; and
in response to the user selection, providing, by the one or more processors, a list of names of locations associated with check-ins mapped to the selected category.

7. A system comprising:
one or more computers, each computer comprising at least one processor, and one or more storage devices storing instructions that are operable, when executed by the one or more computers, to cause the one or more computers to perform operations comprising:
receiving data associated with a plurality of check-ins performed by users of an electronic social networking platform, the received data indicating, for each check-in of the plurality of check-ins, (i) a location of the check-in, and (ii) two or more different tags associated with the location within the electronic social networking platform that are used by the electronic social networking platform to describe the location;
accessing a mapping of tags used by the electronic social networking platform to describe locations represented within the electronic social networking platform to categories from a list of multiple categories, wherein each tag is mapped to a single category within the list of multiple categories, wherein the list of multiple categories comprises a ranking;
determining for each check-in of the plurality of check-ins one or more categories from the list of multiple categories based on the mapping of tags to categories;
identifying for each check-in of the plurality of check-ins a single category from the determined one or more categories for the check-in,
wherein multiple different categories from the list of multiple categories were determined for a particular check-in of the plurality of check-ins, each of the multiple different categories corresponding to a different one of the two or more different tags associated with the location of the particular check-in; and
wherein identifying the single category for the particular check-in comprises selecting a highest ranking single category for the location of the particular check-in from among the multiple different categories based on the ranking of the list of multiple categories;
storing data associating each check-in of the plurality of check-ins in association with the identified category for the check-in; and
outputting, for display, data representing the plurality of check-ins and the respective single category for each check-in.

8. The system of claim 7, wherein identifying for each check-in of the plurality of check ins a single category from the determined one or more categories comprises analyzing information associated with the location of the respective check-in to identify the single category from the determined one or more categories.

9. The system of claim 7, wherein receiving data associated with a plurality of check-ins performed by users of an electronic social networking platform, each check-in of the plurality of check-ins identifying a location and two or more tags associated with the location within the electronic social networking platform that are used by the electronic social networking platform to describe the location comprises receiving data associated with a plurality of check-ins performed by users of an electronic social networking platform, each check-in of the plurality of check-ins identifying a location and two or more tags associated with the location within the electronic social networking platform that are used by the electronic social networking platform to describe the location, and including one or more of a name of the location, an identity of the user of the electronic social networking platform who performed the check-in, and a date that the check in was recorded with the social networking platform.

10. The system of claim 7, wherein the operations further comprise:
   determining that a set of users of the electronic social networking platform has performed at least two check-ins at a particular location; and
   storing information identifying the set of users as repeat visitors of the particular location, and
   wherein outputting, for display, data representing the plurality of check-ins and the respective single category for each check-in comprises outputting, for display, data representing the plurality of check-ins and the respective single category for each check-in including information identifying the repeat visitors.

11. The system of claim 10, wherein outputting, for display, data representing the plurality of check-ins and the respective single category for each check-in including information identifying the set of repeat visitors comprises outputting, for display, data representing the plurality of check-ins and the respective single category for each check-in including information identifying unique visitors for the category.

12. The system of claim 7, wherein the operations further comprise:
   receiving a user selection of a category; and
   in response to the user selection, providing a list of names of locations associated with check-ins related to the selected category.

13. A non-transitory computer-readable medium storing software comprising instructions executable by one or more computers which, upon such execution, cause the one or more computers to perform operations comprising:
   receiving, by one or more processors, data associated with a plurality of check-ins performed by users of an electronic social networking platform, the received data indicating, for each check-in of the plurality of check-ins, (i) a location of the check-in, and (ii) two or more different tags associated with the location within the electronic social networking platform that are used by the electronic social networking platform to describe the location;
   accessing, by the one or more processors, a mapping of tags used by the electronic social networking platform to describe locations represented within the electronic social networking platform to categories from a list of multiple categories, wherein each tag is mapped to a single category within the list of multiple categories, wherein the list of multiple categories comprises a ranking;
   determining for each check-in of the plurality of check-ins, by the one or more processors, one or more categories from the list of multiple categories based on the mapping of tags to categories;
   identifying for each check-in of the plurality of check-ins, by the one or more processors, a single category from the determined one or more categories for the check-in,
      wherein multiple different categories from the list of multiple categories were determined for a particular check-in of the plurality of check-ins, each of the multiple different categories corresponding to a different one of the two or more different tags associated with the location of the particular check-in; and
      wherein identifying the single category for the particular check-in comprises selecting a highest ranking single category for the location of the particular check-in from among the multiple different categories based on the ranking of the list of multiple categories;
   storing, by the one or more processors, data associating each check-in of the plurality of check-ins in association with the identified category for the check-in; and
   outputting for display, from the one or more processors, data representing the plurality of check-ins and the respective single category for each check-in.

14. The non-transitory computer-readable medium of claim 13, wherein identifying for each check-in of the plurality of check-ins, by the one or more processors, a single category from the determined one or more categories comprises analyzing information associated with the location of the respective check-in to identify the single category from the determined one or more categories.

15. The non-transitory computer-readable medium of claim 13, wherein receiving, by one or more processors, data associated with a plurality of check-ins performed by users of an electronic social networking platform, at least some check-ins of the plurality of check-ins identifying a location and two or more tags associated with the location within the electronic social networking platform that are used by the electronic social networking platform to describe the location comprises receiving, by one or more processors, data associated with a plurality of check-ins performed by users of an electronic social networking platform, at least some check-ins of the plurality of check-ins identifying a location and two or more tags associated with the location within the electronic social networking platform that are used by the electronic social networking platform to describe the location, and including one or more of a name of the location, an identity of the user of the electronic social networking platform who performed the check-in, and a date that the check in was recorded with the social networking platform.

16. The non-transitory computer-readable medium of claim 13, wherein the operations further comprise:
   determining, by the one or more processors, that a set of users of the electronic social networking platform has performed at least two check-ins at a particular location; and
   storing, by the one or more processors, information identifying the set of users as repeat visitors of the particular location, and
   wherein outputting for display, from the one or more processors, data representing the plurality of check-ins and the respective single category for each check-in comprises outputting for display, from the one or more processors, data representing the plurality of check-ins and the respective single category for each check-in including information identifying the repeat visitors.

17. The non-transitory computer-readable medium of claim 16, wherein outputting for display, from the one or more processors, data representing the plurality of check-ins and the respective single category for each check-in including information identifying the set of repeat visitors comprises outputting for display, from the one or more processors, data representing the plurality of check-ins and the respective single category for each check-in including information identifying unique visitors for the category.

* * * * *